(12) United States Patent
Hendriks et al.

(10) Patent No.: US 6,947,368 B2
(45) Date of Patent: Sep. 20, 2005

(54) DUEL-LAYER OPTICAL SCANNER WITH NON-PERIODIC PHASE STRUCTURE ELEMENT OF BIREFRINGENT MATERIAL FOR DIFFERENT WAVEFRONT ABERRATION COMPENSATION OF ORTHOGONALLY POLARIZED RADIATION BEAMS

(75) Inventors: Bernardus Hendrikus Wilhelmus Hendriks, Eindhoven (NL); Jorrit Ernst De Vries, Eindhoven (NL); Sjoerd Stallinga, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 418 days.

(21) Appl. No.: 10/020,054

(22) Filed: Dec. 7, 2001

(65) Prior Publication Data
US 2003/0107981 A1 Jun. 12, 2003

(51) Int. Cl.⁷ .............................. G11B 7/00; G02B 27/44
(52) U.S. Cl. .............................. 369/112.26; 369/112.08; 359/742
(58) Field of Search ........................ 369/112.26, 112.08; 359/741, 742

(56) References Cited

U.S. PATENT DOCUMENTS

| | | | | |
|---|---|---|---|---|
| 5,311,494 A | * | 5/1994 | Sugita et al. ............... | 369/100 |
| 5,640,406 A | * | 6/1997 | Injeyan et al. ............... | 372/33 |
| 6,580,674 B1 | * | 6/2003 | Nishiyama et al. .... | 369/112.01 |
| 6,636,365 B2 | * | 10/2003 | Saito et al. ................... | 359/719 |
| 6,643,244 B1 | * | 11/2003 | Iwasaki .................. | 369/112.01 |
| 6,687,209 B2 | * | 2/2004 | Ota et al. ............... | 369/112.08 |
| 6,707,607 B2 | * | 3/2004 | Hendriks et al. ........... | 359/565 |

FOREIGN PATENT DOCUMENTS

| | | | | |
|---|---|---|---|---|
| EP | 1126291 | 8/2001 | ............ | G02B/5/30 |
| JP | 174614 | 6/2001 | ............ | G02B/5/18 |
| WO | WO0124174 | 4/2001 | ............ | G11B/7/135 |

OTHER PUBLICATIONS

Lee et al., "HD/DVD Compatibility Using Polarization Phase Comparator (PPC) in Optical Disk", Technical Digest of the International Symposium on Optical Memory, Oct. 2001, pp. 308–309, XP008020538.

* cited by examiner

*Primary Examiner*—Gautam R. Patel
(74) *Attorney, Agent, or Firm*—Michael E. Belk

(57) ABSTRACT

An optical scanning device for scanning a dual-layer optical record carrier with dual orthogonally polarized radiation beams. The device having a spherical aberration compensation optical subsystem including a switchable liquid crystal cell of birefringent material for altering different optical paths lengths provided by a phase structure of stepped annular zones.

22 Claims, 7 Drawing Sheets

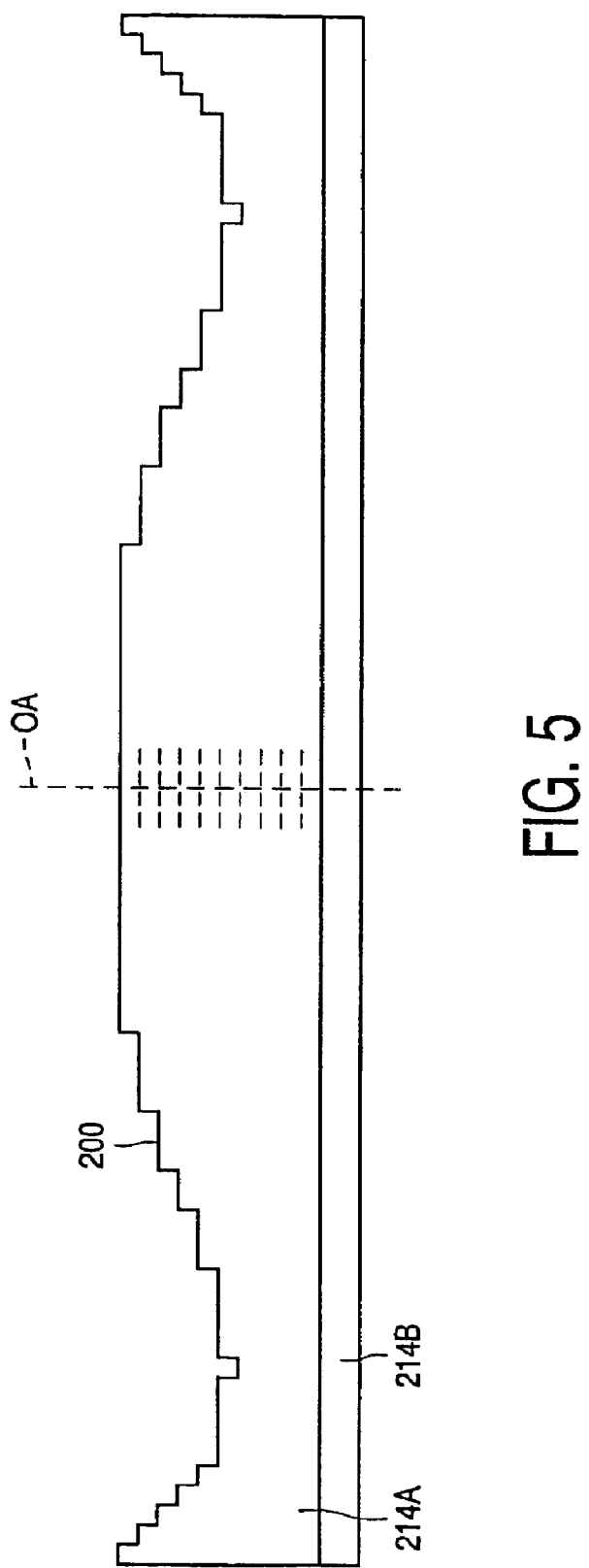

DUEL-LAYER OPTICAL SCANNER WITH NON-PERIODIC PHASE STRUCTURE ELEMENT OF BIREFRINGENT MATERIAL FOR DIFFERENT WAVEFRONT ABERRATION COMPENSATION OF ORTHOGONALLY POLARIZED RADIATION BEAMS

FIELD OF THE INVENTION

This invention relates to an optical scanning device, and an optical element for use therein, for scanning an optical record carrier, such as an optical disk, comprising an information layer, the device comprising a radiation source for generating a radiation beam and an objective lens, located in an optical path between the radiation source and the information layer, for converging the radiation beam to a spot on the information layer. In particular, but not exclusively, the invention relates to an optical scanning device including an optical element to compensate for spherical aberrations generated by different optical path lengths (referred to herein as information layer depths) through which the beam travels in an optical disk to reach an information layer in the disk.

BACKGROUND OF THE INVENTION

There is a need for the production of optical record carriers of high capacity. Therefore, optical scanning devices using a relatively short wavelength radiation beam, for example a radiation beam of 400 nm, a high numerical aperture (NA) objective lens system, at least 0.7 and for example NA=0.85, and a thin protective cover layer, for example 80 µm thickness, are desirable. Furthermore, the capacity can be increased by providing a dual layer disk. At the wavelength and NA mentioned, a layer separation of at least 20–30 µm is desirable in order to reduce the coherent cross talk to an acceptable level. Without compensating measures, refocusing from one layer to the other results in spherical aberration, generating a wavefront error of 200–300 mλ (rms), which deteriorates the resolution of the optical spot formed.

It is known to mechanically adjust the spacing of the two, or more, lens elements of a compound objective lens, in order to provide spherical aberration compensation. Another method of compensation is by mechanically adjusting the position of a collimator lens with respect to the radiation source, so that the radiation beam impinges on the objective lens as a convergent, or divergent, instead of collimated, beam. Each of these methods compensates spherical aberration generated in the optical system of the scanning device, to at least approximately cancel out that generated in the optical disk being scanned.

However, using mechanical actuators to provide spherical aberration compensation, particularly when a separate mechanical actuator is used to provide focus control, is relatively complex and therefore increases the cost of manufacture of the scanning device.

A further known optical scanning device is described in WO-A-124174, in which a radiation beam is passed through a twisted nematic (TN) liquid crystal cell which selectively rotates the polarization of incident light by 90°. The beam is then passed, when in a convergent state, through a birefringent plate to produce spherical aberration therein. The birefringent plate produces different amounts of spherical aberration depending on the state of the TN cell, to compensate for the different information layer thicknesses.

EP-A-08605037 A1, and an article Applied Optics volume 38 (1999) pp 3778–3786 by R. Katayama, describes a phase structure which is used to make an objective lens designed for scanning DVD record carriers also suitable for scanning CD record carriers. In general, DVD record carriers are designed for being scanned with a radiation beam of a wavelength and numerical aperture different from that used for scanning a previous generation of record carrier such as CD. The phase structure consists of stepped non-periodic annular zones, such that each zone gives rise to a phase step which is equal to a multiple of $2\pi$ for the DVD wavelength (660 nm), so that the phase structure has no effect at this wavelength. For CD read out, however a different wavelength is used (785 nm). Consequently, the stepped phase profile results now in phase steps which no longer are equal to a multiple of $2\pi$. By proper design of the steps heights and zone width, the phase introduced by the phase structure in the CD case reduces the wavefront aberration caused by the disk thickness difference to below the diffraction limit. The structure is capable of reducing the wavefront aberration for two discrete wavelengths.

JP-A-2001-174614 describes a diffractive device for an optical head for an optical scanning device capable of operating at two different wavelengths. The diffractive device includes a grating formed of a birefringent material embedded in a material having a uniform refractive index. The birefringent material is arranged in a periodic structure, i.e. one which regularly repeats across the element. For one wavelength, the device transmits light at one polarization without diffraction and diffracts light at the orthogonal polarization. For the second wavelength, light is transmitted without diffraction at both polarizations. One drawback is that the production of the periodic phase structure, i.e. the grating, is relatively complex due to the large number of elements within the structure. Furthermore, due to the diffraction, a certain amount of the input light is wasted, which is undesirable.

SUMMARY OF THE INVENTION

It is an object of the invention to provide a non-mechanical wavefront aberration compensation system in an optical scanning device.

In accordance with one aspect of the invention there is provided an optical element for providing wavefront aberration compensation with a first radiation beam having a first polarization and a second radiation beam having a substantially orthogonal, second polarization, the optical element including a part formed of polarization sensitive material and having a surface to be located in the path of the first and second radiation beams, said surface comprising a phase structure in the form of stepped annular zones, the zones forming a non-periodic pattern of optical paths of different lengths, differences in the optical paths for the first radiation beam and the optical paths for the second radiation beam providing a difference in wavefront aberration compensation in the first and second beams respectively.

Wavefront aberration compensation may be provided for information layers at various depths within an optical disk, or between optical disks, even in a relatively high numerical aperture device, without the need for a mechanical system to provide such wavefront aberration compensation.

It is noted that a similar effect could be achieved using birefringent lenses instead of a step-like structure; however the arrangement of the present invention has an advantage in that astigmatism can be reduced; birefringent lenses in general give rise to astigmatism wavefront aberration, because rays do not travel parallel to the optical axis of the lens.

It should be noted that the phase structure according to the invention has a non-periodic pattern, i.e. one which does not regularly repeat in the radial direction, and, therefore, does not form diffraction orders. As a consequence, the phase structure does not have the inherent losses of a grating. The optical element introduces the required wavefront changes without appreciable loss of radiation energy.

BRIEF DESCRIPTION OF THE DRAWINGS

Features and advantages of various embodiments of the invention will become apparent from the following description, given by way of example only, of preferred embodiments of the invention, which refers to the accompanying drawings, wherein:

FIG. 5 is a cross-sectional view of a phase modifying element in accordance with a second embodiment of the invention;

DETAILED DESCRIPTION OF PREFERRED EMBODIMENTS

Figure 1:
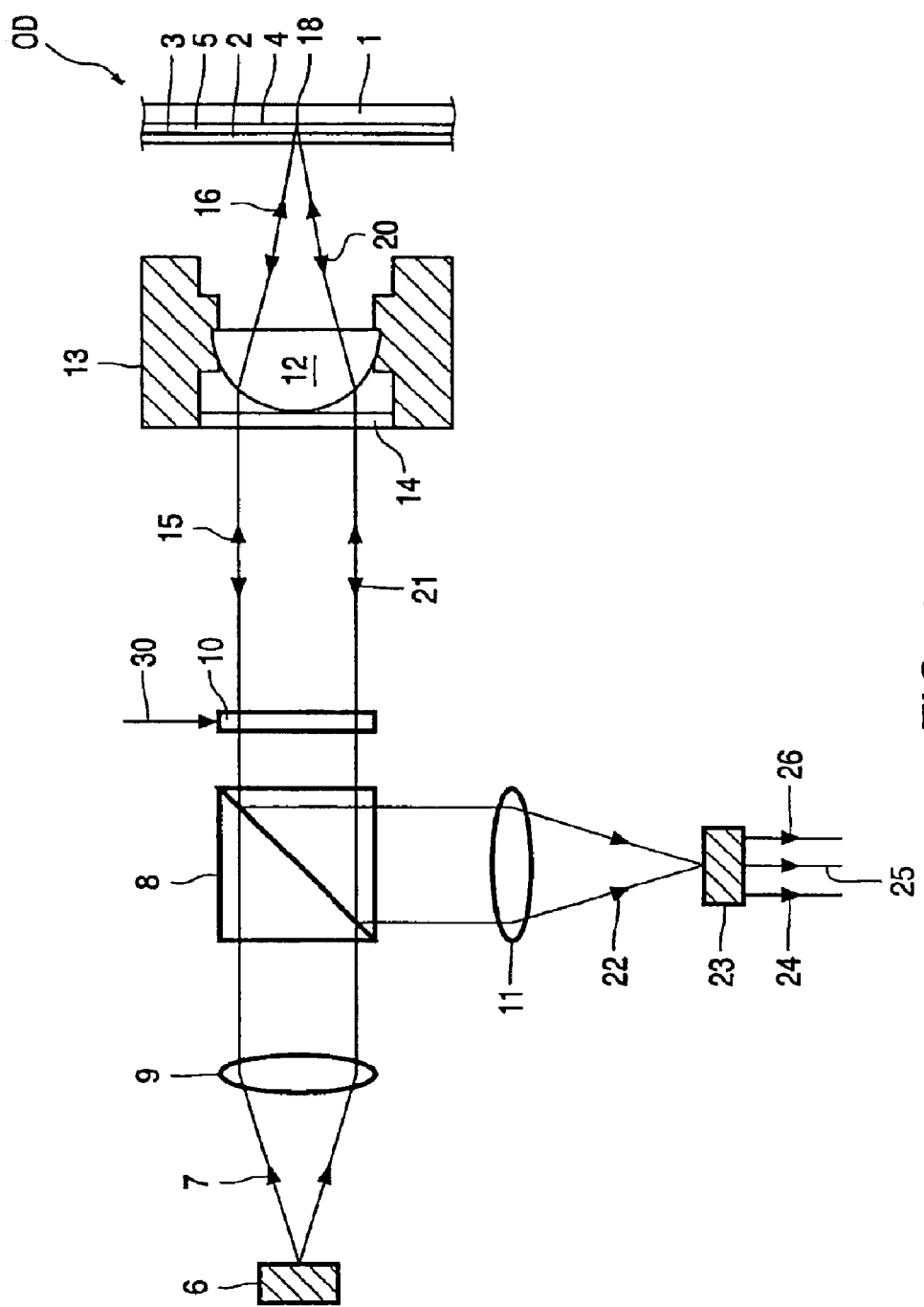
FIG. 1 is a schematic illustration of an optical scanning device arranged in accordance with embodiments of the invention.

FIG. 1 is a schematic illustration of components common to a device, in accordance with each of the embodiments of the invention described by way of example below, for scanning an optical record carrier. The record carrier is for example an optical disk as will be described, by way of example, below.

The optical disk OD comprises a substrate 1 and a transparent layer 2, between which at least one information layer 3 is arranged. In the case of a dual-layer optical disk, as illustrated, two information layers 3, 4 are arranged behind the transparent layer 2, at different depths within the disk, separated by 20 $\mu$m (±10 $\mu$m). A further transparent layer 5 separates the two information layers. The transparent layer 2, having a thickness of approximate 80 $\mu$m (±30 $\mu$m), has the function of protecting the uppermost information layer 3, while the mechanical support is provided by the substrate 1.

Information may be stored in the information layers 3, 4 of the optical disk in the form of optically detectable marks arranged in substantially parallel, concentric or spiral tracks, not indicated in FIG. 1. The marks may be in any optically readable form, e.g. in the form of pits, or areas with a reflection coefficient or a direction of magnetization different from their surroundings, or a combination of these forms.

The scanning device includes an optical pickup unit (OPU) mounted on a radially-movable arm. The OPU includes all components illustrated in FIG. 1, other than the disk OD. A radiation source 6, for example a single semiconductor laser, emits a diverging radiation beam 7 with a wavelength of 400 nm (±10 nm). A beam splitter 8, in this example a polarizing beam splitter, reflects the radiation within a lens system. The lens system includes a collimator lens 9, an objective lens 12 and a condenser lens 11. The objective lens 12 is rigidly mounted on a movable mounting 13 held within mechanical actuators (not shown) for performing radial tracking servo and focus servo adjustment of the position of the objective lens 12. The device also includes a twisted nematic (TN) liquid crystal cell 10 and a phase modifier 14, to be discussed in further detail below. The modifier 14 is rigidly mounted to mounting 13 optical element is commonly mounted with said objective lens, in fixed relation thereto, in said mechanical actuation means. By such common mounting, centring of the optical element in relation to the objective lens is provided during scanning, without dependence on the state of actuation of the objective lens.

The collimator lens 9 refracts the diverging radiation beam 7 to form a collimated beam 15. By collimated, we intend to mean a substantially parallel beam, for which the compound objective lens has a transverse magnification substantially equal to zero. The need for a collimated beam arises when the birefringent phase modifier 14, and other optical elements in the collimated beam path are designed for use with an ideally collimated (parallel) beam, as in this embodiment. A collimated beam is however not necessary when the elements in the beam path are designed for use with a divergent or convergent beam. Even using elements designed for use with an ideally collimated beam, a certain tolerance as to vergence of the beam is acceptable, depending on the efficiency required of the optical system. To achieve the efficiency desired of the present optical system, the collimated beam preferably has a vergence resulting in an absolute magnification of the objective lens smaller than 0.02.

The objective lens 12 transforms the collimated radiation beam 15 into a converging beam 16 having a high numerical aperture (NA), in this example 0.85, which comes to a spot 18 on the information layer, 3 or 4, being scanned.

Radiation of the converging beam 16 reflected by the information layer 3 or 4 forms a diverging reflected beam 20, which returns along the optical path of the forward converging beam. The objective lens 12 transforms the reflected beam 20 to a substantially collimated reflected beam 21, and the beam splitter 8 separates the forward and reflected beams by transmitting at least part of the reflected beam 21 towards the condenser lens 11.

The condenser lens 11 transforms the incident beam into a convergent reflected beam 22 focused on detection systems, generally indicated by a single element 23 although a plurality of detector elements are used. The detection systems capture the radiation and convert it into electrical signals. One of these signals is an information signal 24, the value of which represents the information read from the information layer being scanned. Another signal is a focus error signal 25, the value of which represents the axial difference in height between the spot 18 and the respective information layer 3, 4 being scanned. Another signal is a tracking error signal 26, the value of which represents a radial deviation of the spot from the track being scanned. Each of the signals 25, 26 are input to the focus servo and tracking servo mechanical actuators controlling the position of mounting 13 during scanning.

Another signal input into TN cell 10 is a spherical aberration control signal 30. The spherical aberration control signal 30 represents the selected information layer 3 or 4 in the optical disk currently being scanned.

Figure 2A:
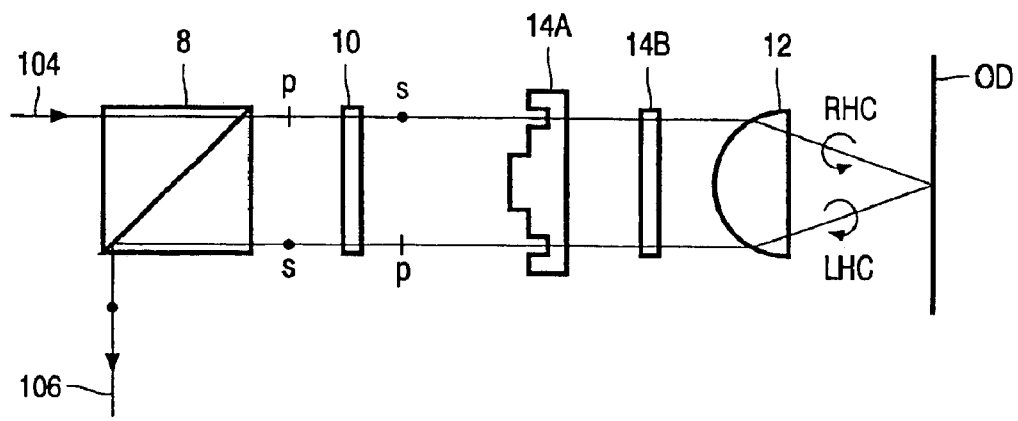
FIG. 2 is a schematic illustration of optical components used in the arrangement of FIG. 1.
Figure 2B:
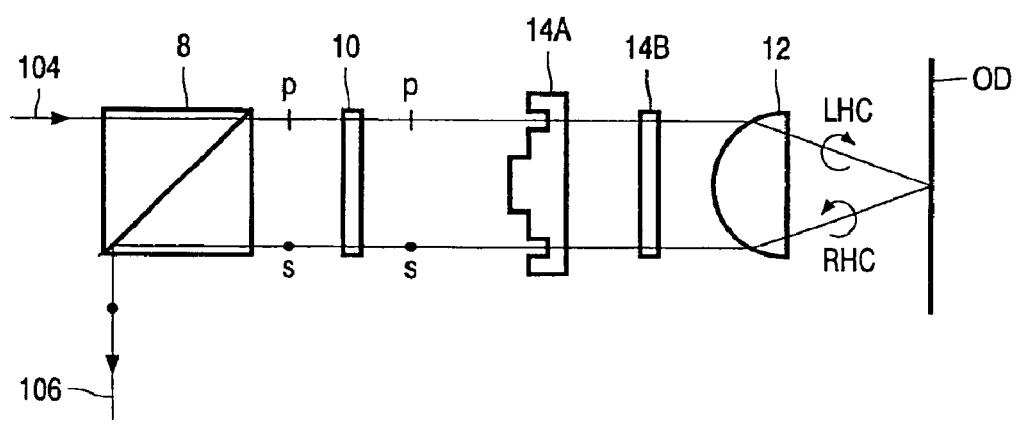

FIGS. 2(A) and 2(B) schematically illustrate an embodiment of the invention, including those components forming part of a spherical aberration compensation optical subsystem. The TN cell 10 is a planar cell, consisting of a liquid crystal layer interposed between two transparent planar plates having conductive transparent layers formed on the inner surfaces thereof, forming the electrodes of the TN liquid crystal cell 10. As is known in the art of TN liquid crystal cells, in addition to the electrode layers, the surfaces of the electrodes adjacent the liquid crystal layer are coated with an alignment material. The material at one side of the liquid crystal cell 10 aligns the liquid crystal molecules in an orientation which is perpendicular to the direction of orientation with which the material on the other side of the liquid crystal cell aligns the liquid crystal molecules. Accordingly, a 90° twist is formed in the bulk of the liquid crystal layer, between the two sides of the liquid crystal cell, when the cell 10 is in an off-state. The liquid crystal cell 10 is connected to a voltage source which is controlled by the spherical aberration control signal 30. When switched on, the voltage source switches the liquid crystal cell 10 into an on-state, in which the liquid crystal molecules are aligned generally parallel to the optical axis of the objective lens 12. In the off-state of the liquid crystal cell 10, the polarization of the incident radiation is rotated through 90° when passing through the liquid crystal cell 10. Conversely, in the on-state, the liquid crystal cell 10 has no effect on the polarization of the radiation passing through the cell 10.

The liquid crystal layer in the TN liquid crystal cell 10 is relatively thin, typically at 4–6 $\mu$m. The response speed of the spherical aberration compensation optical subsystem is correspondingly fast, with the cell switching between on and off states within 10–50 ms.

A further component of the spherical aberration compensation optical subsystem is a passive phase modifier 14A. The phase modifier 14A is formed of a linear birefringent material, such as a cured liquid crystal compound having its molecules aligned along an optic axis. A spherical aberration compensating wavefront aberration generated in the phase modifier 14A, which is dependent upon the optical path length in the birefringent material, is variable between two discrete states, by switching the TN liquid crystal cell 10. The refractive index of the phase modifier 14A varies, by $\Delta n = n_o - n_e$, with the polarization of the incident radiation. The refractive index of the birefringent phase modifier is $n_o$ when the polarization of the incident radiation is perpendicular to its optic axis, whereas the refractive index is $n_e$ when the polarization of the incident radiation is parallel to its optic axis.

A polarization rotating element 14B, such as a quarter wavelength retarder plate, is interposed between the birefringent phase modifier 14A and the optical disk OD, in order to improve the optical efficiency of the device in combination with the polarizing beam splitter 8, by creating a 90° rotation in polarization between the reflected and incident beams at the polarizing beam splitter 8.

Referring now to FIG. 2(A) which illustrates the TN liquid crystal cell 10 in an off-state, an incident beam, indicated at 104, generated by the radiation source 6, first passes through the polarizing beam splitter 8 with a P-type polarization. On passing through the TN liquid crystal cell 10, the polarization of the incident beam is rotated to an S-type polarization. The beam passes through the birefringent phase modifier 14A, the birefringent phase modifier 14A exhibiting a refractive index of $n_o$ in this case since the optic axis of the birefringent phase modifier 14A is arranged in the P-direction. On then passing through the quarter wavelength plate 14B, the polarization of the incident beam is modified to a right-handed circular polarization, and the incident beam is reflected from the information layer 3 or 4 being scanned in the optical disk 1. The polarization of the reflected beam is thereby modified to a left-handed circular polarization, which on passing through the quarter wavelength plate 14B is modified to a P-type polarization.

On passing through the birefringent phase modifier 14A, the reflected beam experiences a refractive index of $n_e$, and on passing through the off-state TN liquid crystal cell 10 the P-type polarization is modified to an S-type polarization by the 90° rotation effect of the TN liquid crystal cell 10. The polarizing beam splitter 8 reflects the majority of the reflected beam, in its S-type polarization state, towards the detector 23 in the beam indicated at 106.

Referring now to FIG. 2(B), the discussion relating to FIG. 2(A) applies, however in this case the TN liquid crystal cell 10 is switched to an on-state by the spherical aberration control signal 30. Thus, the polarization of the radiation incident on the TN liquid crystal cell 10 is unaffected by its passage through the cell 10. Accordingly, the beam when passing through the birefringent phase modifier 14A remains in a P-type polarization state and experiences a refractive index of $n_e$, thereby generating a different pattern of wavefront aberration to the pattern of wavefront aberration generated in the off-state of the TN liquid crystal cell 10 described in relation to FIG. 2(A). Correspondingly, when the reflected beam passes through the birefringent phase modifier 14A, the beam is in an S-type polarization state, and experiences a refractive index of $n_o$, again generating a different pattern of wavefront aberration to that generated when the TN liquid crystal cell 10 is in an off-state. When the reflected beam meets the polarizing beam splitter 8 the reflected beam is in an S-type polarization, and the polarizing beam splitter 8 reflects the majority of the beam towards the detector 23.

Switching the TN liquid crystal cell 10 thus creates a difference in the shape of the wavefront of the beam incident upon the optical disk. The different wavefront aberrations generated in the phase modifying element 14A are used to compensate spherical aberrations generated by the passage of the beam through the transparent layers 2, 5. An improved resolution can thus be obtained at each of the information layers 3, 4 of the disk, even though two different depths of information layer are required to be read by the scanning device, in this example in a dual-layer optical disk.

Figure 3:
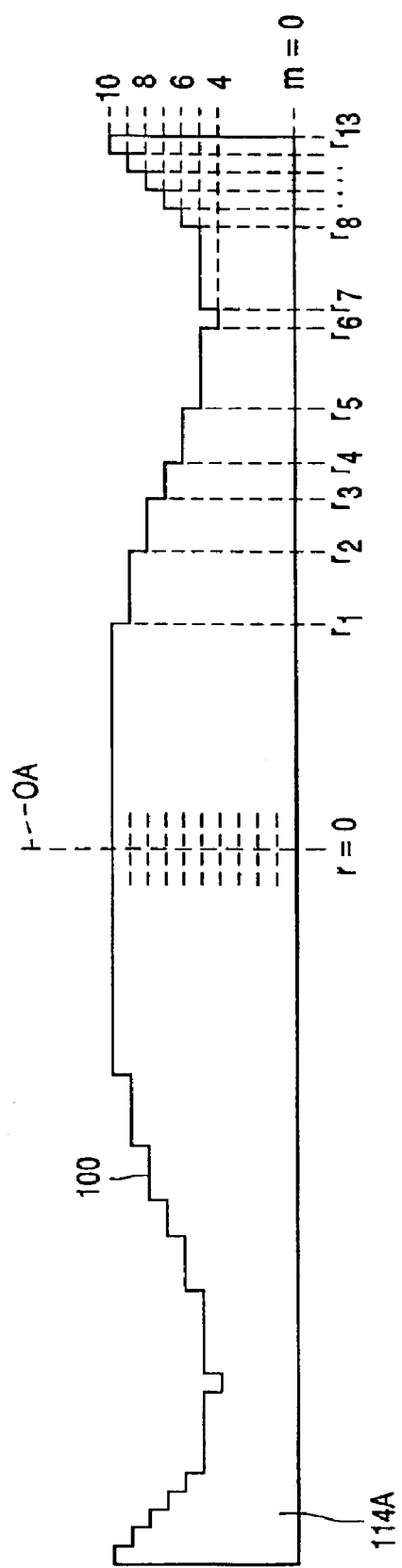
FIG. 3 is a cross-sectional view of a phase modifying element in accordance with a first embodiment of the invention.

FIG. 3 shows an example of a non-periodic phase structure (NPS) surface 100 formed of stepped annular zones on a phase modifier 114A for use in the arrangement of FIG. 1, scanning each of the two information layers 3, 4 of a dual layer disk at approximately 400 nm. The phase modifier is formed of a physically uniform birefringent material interfacing, at least on the side of the NPS, with air. This allows the weight of the optical element to be reduced, thereby aiding operation of the mechanical actuation means, which generally operates at high frequencies. Furthermore, the step heights of the annular zones can generally be reduced, in comparison with that required when the surface interfaces with a covering material, as is the case in further embodiments of the invention detailed below. The opposite, planar, side of the part formed of birefringent material may also interface with air, or may be formed on a planar substrate, such as a glass plate. The disk has a transparent cover layer 2 of 80 $\mu$m and a layer separation of 20 $\mu$m. The entrance pupil diameter of the lens 12 is 3 mm (i.e. the radial distance from the optical axis OA varies from 0 to 1.5 mm) and the NA=0.85.

Figure 4A:
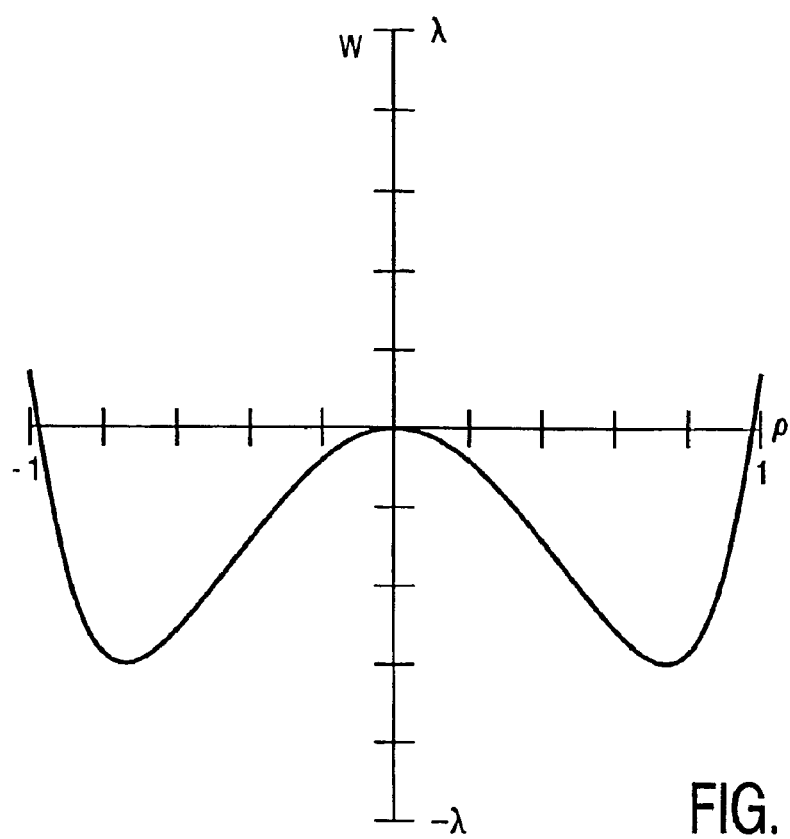
FIG. 4 shows wavefront aberrations before and after compensation.

Consider the case where the spot is focused on the information layer 3 with a depth of 80 μm, whilst the lens is optimised for an information layer depth of 100 μm. The smaller information layer depth results in spherical wavefront aberration optical path difference $W(\rho)$ as shown in FIG. 4(A) which is given by $$W(\rho)=\lambda f(\rho) \quad (1)$$

with $$f(\rho)=0.17138\rho^2-0.43388(6\rho^4-6\rho^2)-0.08569(20\rho^6-30\rho^4+12\rho^2) \quad (2)$$

while $\rho$ is the relative pupil coordinate. Note that the defocus constant (0.17138) is selected in the lens design in such a way that $f(1)=0$. $2\pi f(\rho)$ is the wavefront phase introduced by the variation in information layer depth. The root mean square of the optical path difference (OPD (rms)) of the above wavefront aberration is 194 mλ.

In order to compensate for the spherical aberration generated in the disk, an NPS having zones generating wavefront deviations approximating the spherical aberration is used. The zones are planar annular regions arranged concentric to a perpendicular to the optical axis of the element. At the same part of each zone, for example the outer periphery, centre or inner periphery, the wavefront deviation generated (for one polarization state of the radiation) corresponds most closely with the phase aberration being compensated; greater (but still reduced) aberrations remain in the other parts of each zone. Furthermore, the step heights are chosen so that, for the other polarization state, a phase of a multiple of $2\pi$ is generated by each of the zones. In this embodiment for illustrative purposes we take $n_o=1.5$ and $$n_e = \frac{15}{9} = 1.6667,$$

hence a step height increment of:

$$h_e=\lambda/(n_e-1)=0.72 \ \mu m \quad (3)$$

is used. As a result a step with height $mh_e$ (m being an integer) introduces for the ordinary ray a phase equal to $$\Phi_{o,m} = m2\pi h_e(n_o - 1)/\lambda = m2\pi\frac{9}{10}. \quad (4)$$

The number of zones used is selected on the basis of two competing criteria, the first being to increase the number of zones to provide a desired amount of wavefront aberration compensation, and the second being to reduce the number of zones so as to increase the efficiency of production of the device. The number of zones is preferably selected at between 5 and 25 zones, more preferably between 10 and 20 zones; in this example the number of zones chosen is selected to be 13, each zone having a radial extent as illustrated in Table 1.

TABLE 1

| Zone | relative pupil coordinate (ρ) | m | Φ/(2π) Mod 1 |
| --- | --- | --- | --- |
| 1 | 0.3112 | 10 | 0.0 |
| 2 | 0.3966 | 9 | 0.1 |
| 3 | 0.4711 | 8 | 0.2 |
| 4 | 0.5424 | 7 | 0.3 |
| 5 | 0.6184 | 6 | 0.4 |
| 6 | 0.7525 | 5 | 0.5 |
| 7 | 0.7660 | 4 | 0.6 |
| 8 | 0.8666 | 5 | 0.5 |
| 9 | 0.9049 | 6 | 0.4 |
| 10 | 0.9352 | 7 | 0.3 |
| 11 | 0.9546 | 8 | 0.2 |
| 12 | 0.9735 | 9 | 0.1 |
| 13 | 1.0000 | 10 | 0.0 |

Table 1 gives the relative pupil coordinates of the outermost points ($r_1$ to $r_{13}$) of each of the thirteen zones of the NPS together with the number of step height increments m used in each zone and the corresponding relative phase. In this embodiment, the number of step height increments m used for each zone respectively is selected such that a zone generating the largest phase deviations is the smallest in thickness, and a zone generated the smallest phase variation is the largest in thickness. Note that, by such selection, the variation in thickness of the zones of the NPS can be arranged to be less than half the number of zones multiplied by the step height increment, in this case only 4.3 μm.

Figure 4B:
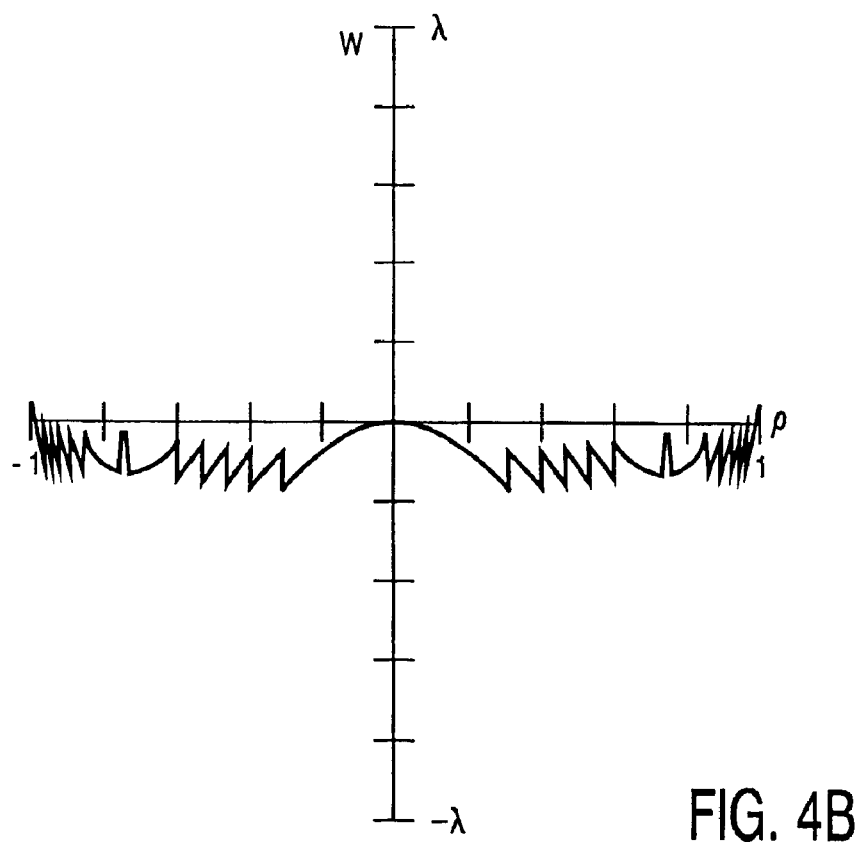

FIG. 4(B) shows the compensated wavefront aberration with the above structure present is shown. The wavefront aberration is reduced from 194 mλ (rms) to 37 mλ (rms), which is well below the diffraction limit at the operation wavelength, so that a diffraction limited spot size is obtained.

FIG. 5 illustrates a further embodiment of the invention, in which the birefringent phase modifying element 214A is integrated with a quarter wave retarder plate 214B, the two elements being bonded together at a planar interface. The phase modifier 214A includes a non-periodic phase structure 200 similar to that illustrated in FIG. 3.

Figure 6:
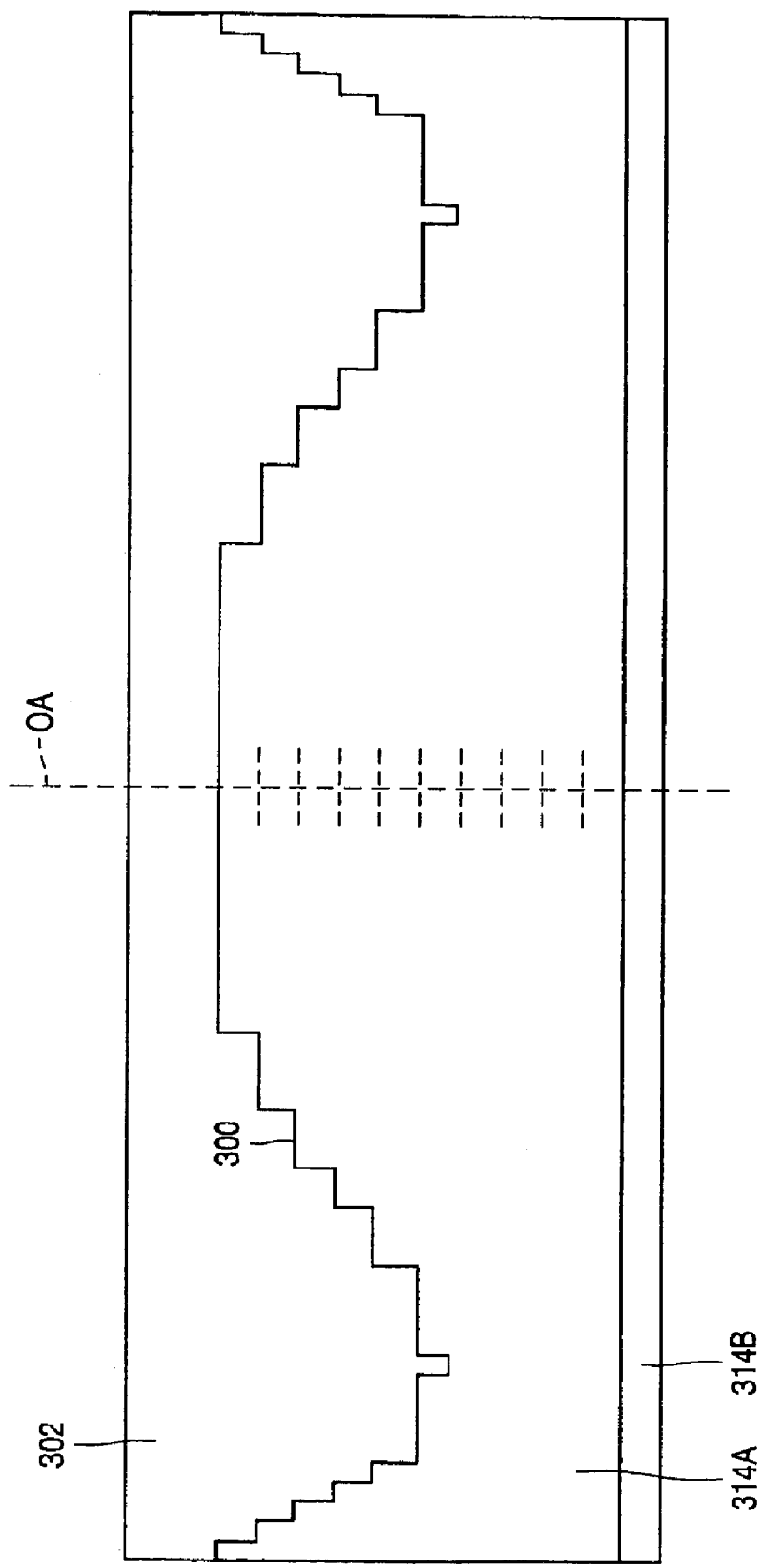
FIG. 6 is a cross-sectional view of a phase modifying element in accordance with a third embodiment of the invention.

FIG. 6 illustrates a further embodiment of the invention, in which the wavefront aberration is generated by means of a phase modifier including a part formed of birefringent material 314A integrated with a part 302 formed of a non-polarization sensitive material, i.e. one having only a single refractive index. The non-periodic phase structure surface 300 forms an interface between the part 314A and 302. In this case, the zones occupy the radial extents set out in Table 1, however the step heights are increased, in that the step height increments are defined by:

$$h_e=\lambda/(n_e-n_1), \quad (5)$$

where $n_1$ is the refractive index of the non-polarization sensitive material, in this example for illustrative purposes we take $h_e=7.19$ μm, $n_1=1.45$, $n_o=1.5$ and $n_e=1.5056$.

The phase modifier in this embodiment is also integrated with a quarter wave retarder plate 314B, the parts 314A and 314B being bonded via a planar interface.

Figure 7:
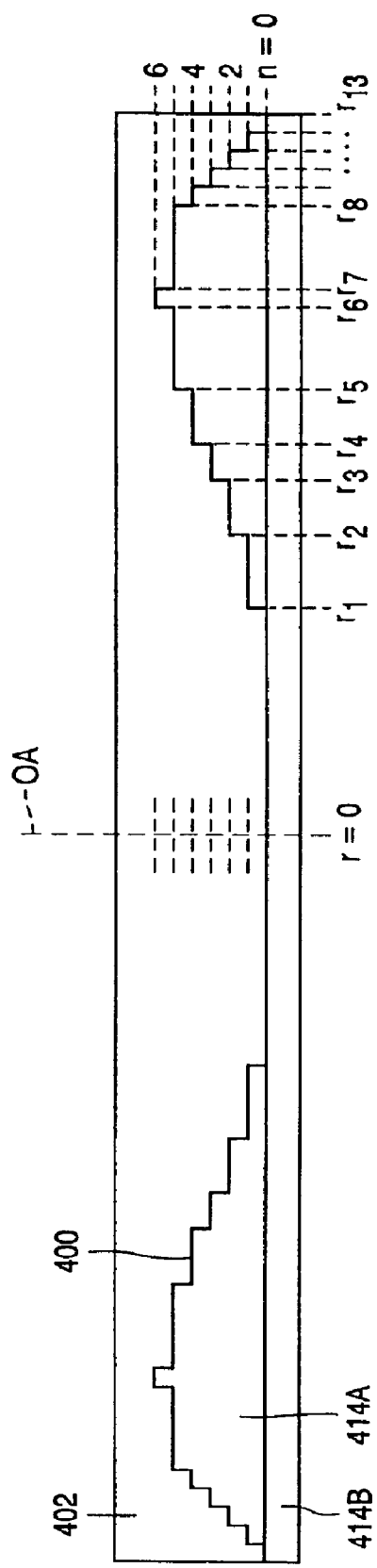
FIG. 7 is a cross-sectional view of a phase modifying element in accordance with a fourth embodiment of the invention.

FIG. 7 illustrates a yet further embodiment of the invention, in which the birefringent phase modifier 414A is integrated with a part 402 formed of non-polarization sensitive material having a refractive index matching the ordinary refractive index, $n_o$ of the birefringent material of part 414A. Due to the refractive index matching at one polarization the interface 400 of the non-periodic phase structure surface is invisible to the light at one polarization, independent of the step heights.

By matching the two refractive indices, i.e. $n_1=n_o$, where $n_1$ is the refractive index of the non-polarization sensitive material, a greater freedom in the selection of the step heights is provided. A further criteria has been applied in the arrangement shown in FIG. 7, namely to maintain the step heights at a minimum, so as to reduce the amount of birefringent material required in the non-periodic phase structure. The formula used to select each zone height is as follows:

$$H = \frac{W(\rho_s)}{(n_e - n_1)} + \frac{q\lambda}{(n_e - n_1)} \quad (6)$$

While $\rho_s$ is the relative pupil coordinate at a selected part (e.g. outer periphery, centre or inner periphery) of the zone, and q is an integer ( . . . , −2, −1, 0, 1, 2 . . . ), in this embodiment zero to reduce the step heights.

In this embodiment the zones are arranged to have a step height increment which is constant; however this is not necessary. Due to the matching of the refractive indices irregular variations in step height increments may also be used. In this embodiment, the (constant) increment in step height used is $h_e = \lambda/(10(n_e - n_o)) = 0.24$ μm. Furthermore, the number and radial arrangement of zones is the same as that of the previous embodiments. The number of step height increments, n, selected in each zone are given in Table 2 below.

TABLE 2

| zone | relative pupil coordinate (ρ) | n | Φ/(2π) |
|---|---|---|---|
| 1 | 0.3112 | 0 | 0.0 |
| 2 | 0.3966 | 1 | 0.1 |
| 3 | 0.4711 | 2 | 0.2 |
| 4 | 0.5424 | 3 | 0.3 |
| 5 | 0.6184 | 4 | 0.4 |
| 6 | 0.7525 | 5 | 0.5 |
| 7 | 0.7660 | 6 | 0.6 |
| 8 | 0.8666 | 5 | 0.5 |
| 9 | 0.9049 | 4 | 0.4 |
| 10 | 0.9352 | 3 | 0.3 |
| 11 | 0.9546 | 2 | 0.2 |
| 12 | 0.9735 | 1 | 0.1 |
| 13 | 1.0000 | 0 | 0.0 |

Note that the step height increments in this embodiment are significantly smaller than that of the embodiment shown in FIG. 6, and furthermore the total step heights used are smaller than the embodiment shown in FIG. 3. The largest phase deviations are generated by the thickest zones.

Note an advantage of using the stepped annular periodic phase structure in place of a convex birefringent lens having similarly matched refractive indices ($n_e = n_o$) interfacing along a curved phase surface, in that no astigmatism is produced by the element in accordance with the present invention because of the planar arrangement of each zone surface perpendicular to the optical axis, and the element being placed in a collimated beam.

In this embodiment, a quarter wave retarder 414B is also integrated with the phase modifier 414A, the two parts being bonded via a planar interface.

Note that, in the case of the embodiments illustrated in FIGS. 6 and 7, in addition to being integrated with the quarter wave retarder plate, the phase modifier 314A, 414A, may also be integrated with the TN cell; in this case the liquid crystal layer of the TN cell is preferably sandwiched between the planar outer surface of non-polarization sensitive part 302, 402, and a transparent planar cover plate.

It will be appreciated that the present invention allows for the reading of an optical disk of high capacity, using a relatively low wavelength radiation beam, for example a radiation beam of approximately 400 nm wavelength, using a high numerical aperture beam at the optical disk, and without using a mechanical actuator or a birefringent lens to effect spherical aberration compensation, even for varying depths of information layer in the optical disks being read.

Note that, whilst in the above, reference has been made to spherical aberration correction, the invention may also be utilised in relation to other types of wavefront aberration correction. For example, an NPS pattern may be used capable of correcting coma wavefront aberration. In this case, switching the TN cell results in a different amount of wavefront deviation being generated approximating to coma, for example in response to detection of excessive tilt of the disk in one state of the TN cell. Similarly, an NPS pattern may be used to correct for astigmatism, wherein different degrees of wavefront deviation may be generated to correct for astigmatism in two different states of the TN cell.

Whilst in the embodiments described above, a TN liquid crystal cell is used to selectively rotate the polarization of the incident radiation through 90°, similar (but less optimal in terms of complexity and the efficiency of the optical system) functionality could be provided by dispensing with the polarization rotating element and instead using either a single radiation source emitting radiation at an orientation of 45° to the axis of birefringence and/or the beam splitter, or two separate radiation sources emitting orthogonally-polarized radiation at each of the required polarizations. The required spherical aberration compensation can then be selected, in accordance with a selection control signal, for example by a switchable polarization-selective filter at the detector. Alternatively, in the case of providing two such separate radiation sources, the sources may be selectively energized in accordance with the selection control signal.

Although the objective lens is indicated in FIG. 1 as having one plano-convex lens element, it may comprise more elements, and other lens types such as convex-convex or convex-concave lenses may also be used. The objective may also comprise a hologram operating in transmission or reflection, or a grating for coupling radiation out of a waveguide carrying the radiation beam.

Note that, herein, the term "annular" is not intended to be limited to an area exhibiting perfect circular symmetry; in one embodiment the annular zones of the NPS exhibit such symmetry; in other embodiments the zones may deviate from perfect circular symmetry.

The above embodiments are to be understood as illustrative examples of the invention. Further embodiments of the invention are envisaged. It is to be understood that any feature described in relation to one embodiment may also be used in other of the embodiments. Furthermore, equivalents and modifications not described above may also be employed without departing from the scope of the invention, which is defined in the accompanying claims.

What is claimed is:

1. An optical element for providing wavefront aberration compensation with a first radiation beam having a first polarization and a second radiation beam having a substantially orthogonal, second polarization, the optical element including a part formed of polarization sensitive material and having a surface to be located in the path of the first and second radiation beams, said surface comprising a phase structure in the form of stepped annular zones, the zones forming a non-periodic pattern of optical paths of different lengths, differences in the optical paths for the first radiation beam slid the optical paths for the second radiation beam providing a difference in wavefront aberration compensation in the first and second beams respectively.

2. An optical element according to claim 1, wherein the difference in wavefront aberration compensation approximates to spherical aberration.

3. An optical element according to claim 1, wherein the wavefront aberration compensation is approximately zero for the second radiation beam when the second radiation beam consists of a predetermined wavelength.

4. An optical element according to claim 1, wherein the polarization-sensitive part is formed of material having a substantially uniform birefringence throughout.

5. An optical element according to claim 1, further comprising a plate having the effect of a quarter wavelength retarder.

6. An optical element according to claim 5, wherein the retarder plate is attached to the polarization sensitive part along a planar interface.

7. The optical element of claim 6 wherein: the phase structure surface of the polarization-sensitive part interfaces only with air.

8. The optical element of claim 6 wherein: the phase structure surface of the polarization-sensitive part interfaces with a non-polarization sensitive material and the central portion of the retarder plate is completely separated from the non-polarization sensitive material by the polarization-sensitive part.

9. The optical element of claim 6 wherein: the phase structure surface of the polarization-sensitive part interfaces with a non-polarization sensitive material; and the central portion of the retarder plate is separated from the non-polarization sensitive material by the polarization-sensitive part.

10. The optical element of claim 5 wherein: the quarter wave plate is separated from the polarization-sensitive part; and the phase structure surface of the polarization-sensitive part interfaces only with air.

11. An optical element according to claim 1, further comprising a part formed of non-polarization sensitive material, the non-polarization sensitive part interfacing with the polarization sensitive part along said surface.

12. An optical element according to claim 11, wherein the polarization-sensitive material exhibits a first refractive index for radiation of said first polarization and a second refractive index for radiation of said second polarization, and wherein the refractive index of the non-polarization sensitive material is selected to match said second refractive index.

13. An optical element according to claim 1, wherein said surface includes between 5 and 25 zones.

14. An optical scanning device for scanning an optical record carrier comprising an information layer, the device comprising a radiation source for generating a radiation beam and an objective lens, located in an optical path between the radiation source and the information layer, for converging the radiation beam to a spot on the information layer, wherein the device includes an optical element for providing wavefront aberration compensation with a first radiation beam having a first polarization and a second radiation beam having a substantially orthogonal, second polarization, the optical element including a part formed of polarization sensitive material and including a surface to be located in the path of the first and second radiation beams, said surface comprising a phase structure in the form of stepped annular zones, the zones forming a non-periodic pattern of optical paths of different lengths, differences in the optical paths for the first radiation beam and the optical paths for the second radiation beam providing a difference in wavefront aberration compensation in the first and second beams respectively.

15. An optical scanning device according to claim 14, wherein the device comprises a collimator lens, wherein the optical element is located between the collimator lens and the objective lens.

16. An optical scanning device according to claim 14, comprising an electra-optical element switchable between a first state, in which the polarization of light exiting the electro-optical element has a first orientation relative to a predetermined polarization of light entering the electra-optical element, and a second state in which the polarization of light exiting the electro-optical element has a second orientation relative to said predetermined polarization, the first and second orientations being substantially orthogonal.

17. An optical scanning device according to claim 16, wherein the optical characteristics of the electra-optical element are altered under control of a selection signal selectively indicating one of at least two discrete information layer depths to be scanned.

18. An optical scanning device according to claim 14, wherein the beam emerging from the objective lens is arranged to impinge on the record carrier with a numerical aperture greater than 0.7.

19. An optical scanning device according to claim 14, the objective lens being mounted in mechanical actuation means for performing servo-based correction of the position of the objective lens during scanning of the optical record carrier, wherein the optical element is commonly mounted with said objective lens, in fixed relation thereto, in said mechanical actuation means.

20. An optical scanning device according to claim 14, wherein said surface interfaces with air.

21. A method of operating the optical scanning device of claim 14, comprising reading an information layer of the record carrier during a scanning operation, and altering the optical characteristics of the device during the scanning operation in order to compensate for a wavefront aberration generated in the record carrier.

22. A method of operating the optical scanning device of claim 14, comprising writing data to an information layer of the record carrier during a scanning operation, and altering the optical characteristics of the device during the scanning operation in order to compensate for a wavefront aberration generated in the record carrier.

* * * * *